United States Patent [19]

Doi et al.

[11] Patent Number: 5,191,037
[45] Date of Patent: Mar. 2, 1993

[54] BIODEGRADABLE POLYMERIC COMPOSITION

[75] Inventors: Yoshiharu Doi, 2617-39 Imajuku-cho, Asahi-ku, Yokohama-shi, Kanagawa-ken; Yoshiharu Kumagai, Yokohama, both of Japan

[73] Assignees: Doi, Yoshiharu, Yokohama; Sumitomo Metal Industries, Ltd., Osaka, both of Japan

[21] Appl. No.: 778,276

[22] Filed: Oct. 17, 1991

[30] Foreign Application Priority Data

Apr. 11, 1991 [JP] Japan .................................. 3-79118

[51] Int. Cl.$^5$ ...................... C08L 67/04; C08G 63/06
[52] U.S. Cl. ..................................... 525/450; 525/64; 528/353; 528/361
[58] Field of Search ................. 525/450, 64, 190, 186, 525/412, 415; 528/361

[56] References Cited

U.S. PATENT DOCUMENTS

| | | | |
|---|---|---|---|
| 4,393,167 | 7/1983 | Holmes et al. | 528/361 |
| 4,427,614 | 1/1984 | Barham et al. | 528/361 |
| 4,477,655 | 10/1984 | Holmes | 528/361 |

FOREIGN PATENT DOCUMENTS 61-69431 4/1986 Japan .

*Primary Examiner*—John Kight, III
*Assistant Examiner*—Shelley A. Dodson
*Attorney, Agent, or Firm*—Burns, Doane, Swecker & Mathis

[57] ABSTRACT

A biodegradable polymeric composition comprising 100 parts by weight of a first polymer which is comprised predominantly of R(−)-3-hydroxybutyric acid and from 3 to 4,000 parts by weight of second polymer which is a random copolymer of R(−)-3-hydroxybutyric acid and S(+)-3-hydroxybutyric acid. The composition provides a flexible article having improved mechanical properties while maintaining biodegradability to a degree at least comparable to that of the first polymer.

13 Claims, No Drawings

BIODEGRADABLE POLYMERIC COMPOSITION

BACKGROUND OF THE INVENTION

This invention relates to a biodegradable polymeric composition and more particularly to a polymeric composition which comprises a poly-R(−)(3-hydroxybutyric acid) or its copolymer produced by microorganisms and which is completely biodegradable and still has sufficient mechanical strength for practical uses.

A poly-R(−)(3-hydroxybutyric acid) (hereinafter abbreviated as PHB) is a biodegradable and biocompatible homopolyester and has prospects for various applications in which biodegradability or biocompatibility is required.

For instance, environmental pollution by waste plastics is becoming more serious and hence there is a great interest in biodegradable plastics. However, the biodegradable plastics proposed so far are either incapable of easy and inexpensive production or insufficient with respect to their mechanical, chemical, or physical properties.

PHB, too, is inadequate with respect to its physical properties in that it is stiff and brittle, and this problem has obstructed PHB from practical applications.

It has been proposed that the stiff and brittle nature of PHB can be alleviated by drawing an article of PHB such as a sheet, film, tape, or fiber after the article has been pretreated by rolling under pressure or by heating in a particular temperature range followed by cooling and maintaining the article at the cooled temperature for a short period [Japanese Patent Application Kokai (Laid-Open) No. 61-69431(1986)].

However, the improvement in the stiff and brittle nature of PHB by drawing is temporary and the resulting drawn article tends to recrystallize and become brittle with time. This tendency is particularly prominent at a relatively high temperature, e.g., in the range of 30°–80° C.

Another attempt to improve the nature of PHB relies on addition of a plasticizer or blending with a different polymer which serves as a plasticizer to form a polymer blend. For example, a polymer blend of PHB with a polyethylene oxide is described in Polymer, 29, 1731 (1988) and that with a polyvinyl acetate is described in Polymer, 30, 1475 (1989).

The alleviation of the stiff and brittle nature of PHB by addition of a plasticizer including a plasticizing polymer which has been proposed in the prior art is also unsatisfactory since PHB does not have a sufficient compatibility with the plasticizer, causing exudation of the plasticizer. As a result, the PHB article becomes brittle again, and if the article is left in the field, the pollution of water or soil by the exudated plasticizer may occur.

For example, when a polyethylene oxide, which is a water-soluble polymer, is used as a plasticizer, the exudated plasticizer will readily be dissolved in underground water. Therefore, the usage of this polymer is strictly regulated.

A blend of PHB with a polyvinyl acetate is still stiff and brittle at room temperature since the glass transition temperature of a polyvinyl acetate is about 38° C. which is higher than ordinary room temperatures. Therefore, the desired improvement in the nature of PHB cannot be satisfactorily attained by the blend.

SUMMARY OF THE INVENTION

It is a primary object of the present invention to improve the stiff and brittle nature of PHB while substantially maintaining the biodegradability thereof.

A more specific object of the invention is to provide a completely biodegradable polymer blend of PHB with a second polymer which can improve the undesirable nature of PHB.

The present inventors have found that these and other objects can be accomplished by blending PHB with a chemically-synthesized polymer of 3-hydroxybutyric acid.

In brief, the present invention resides in a biodegradable polymeric composition comprising 100 parts by weight of a first polymer which is comprised predominantly of R(−)-3-hydroxybutyric acid and from 3 to 4,000 parts by weight of a second polymer which is a random copolymer of R(−)-3-hydroxybutyric acid and S(+)-3-hydroxybutyric acid.

DESCRIPTION OF THE INVENTION

The first polymer is comprised predominantly of R(−)-3-hydroxybutyric acid and it includes a poly-R(−)(3-hydroxybutyric acid) (PHB), which is a homopolymer of R(−)-3-hydroxybutyric acid, as well as a copolymer of at least 50 mole % of R(−)-3-hydroxybutyric acid with less than 50 mole % of other one or more copolymerizable monomers, both the homopolymer and copolymer being produced by a microbiological procedure using microorganisms. These homopolymers and copolymers of R(−)-3-hydroxybutyric acid are hereinafter collectively referred to as a PHB polymer. Thus, the PHB polymer comprises from 50 to 100 mole % of recurring units of the formula: —O—CH(CH$_3$)—CH$_2$—CO— which are derived from R(−)-3-hydroxybutyric acid.

Examples of the copolymerizable monomer which may be present in a PHB polymer are derivatives of R(−)-3hydroxybutyric acid in which one or more hydrogen atoms in this compound are substituted with an alkyl, halogen, hydroxy, haloalkyl, hydroxyalkyl, or similar group. Thus, the copolymerizable monomer produces recurring units of the formula: —O—CR$^1$R$^2$—(CR$^3$R$^4$)$_n$—CO— wherein R$^1$, R$^2$, R$^3$, and R$^4$ are independently selected from hydrogen, halogen, and alkyl, hydroxy, haloalkyl, hydroxyalkyl, and similar groups.

Copolymers of PHB with the above-described one or more comonomers can also be directly produced by a microbiological procedure using microorganisms. For instance, an aerobic culture of a mutant of *Alcaligenes eutrophus* (NCIB 11599) produces a PHB homopolymer on glucose or a copolymer of PHB with R(−)-3-hydroxyvaleric acid on a mixture of glucose and propionic acid, as described in Japanese Patent Application Kokai (Laid-Open) No. 61-69431(1986).

The PHB polymer which is used in the present invention may be either a crude or purified product isolated from a cell-containing culture of suitable microorganisms capable of producing a PHB polymer by any known isolation technique. The origin of the microorganisms used and the isolation and purification methods employed are not critical and are well known to those skilled in the art. Typical microorganisms capable of producing a PHB polymer include *Alcaligenes eutrophus, Bacillus megaterium, Alcaligenes latus,* and the like. Also, the cells themselves which contain a PHB polymer produced by the microorganisms may be used as the first polymer without isolation of the PHB polymer therefrom. Commercially-available, microbiologically-produced PHB polymers are also useful in the present invention.

The first PHB polymer is blended with a second polymer which is a random copolymer comprised of R(−)-3-hydroxybutyric acid and S(+)-3-hydroxybutyric acid. The random copolymer is hereinafter referred to as a racemic PHB copolymer. The racemic PHB copolymer is an atactic polymer in which recurring units derived from the R(−) isomer of 3-hydroxybutyric acid and those from the S(+) isomer thereof are combined at random in a polymer chain.

The racemic PHB copolymer generally has a number-average molecular weight in the range of from 500 to 1,000,000 and a glass transition temperature below 10° C. It can be prepared by chemical synthesis. The method of synthesis is not critical in the preparation of the racemic PHB copolymer and any suitable method can be employed.

By way of example, the racemic PHB copolymer can be prepared by a catalytic ring-opening polymerization of a mixture of R(+)-beta-butyrolactone and S(−)-beta-butyrolactone. The mixture is hereinafter referred to as a racemic BL mixture.

It is preferred that the molar ratio of R(+)-beta-butyrolactone to S(−)-beta-butyrolactone in the racemic BL mixture used as a starting material be in the range of from 100:60 to 100:165 and more preferably from 100:90 to 100:110. Most preferably, this ratio is approximately 100:100. The racemic BL mixture may contain one or more additional monomers in a minor amount, preferably at most 10% by weight in total based on the total weight of the monomer mixture. Examples of the additional monomers which may be present in the racemic BL mixture in such a minor amount are beta-propiolactone, epsilon-caprolactone, glycolide, lactide (which may be either an optically-active isomer or a racemic mixture), and similar lactones.

Consequently, the racemic PHB copolymer prepared from a racemic BL mixture will preferably contain the recurring units corresponding to R(−)-3-hydroxybutyric acid and those to S(+)-3-hydroxybutyric acid with the molar ratio of the R(−) to S(+) isomer being in the range of from 100:60 to 100:165 and more preferably from 100:90 to 100:110, and most preferably approximately 100:100, while the total weight of these recurring units preferably comprises at least 90% by weight of the racemic PHB copolymer.

If the molar ratio of the R(−) to S(+) isomer in the racemic PHB copolymer does not fall within the above broadest range, the racemic PHB copolymer may have an increased degree of crystallinity and cannot necessarily improve the stiff and brittle nature of a PHB polymer sufficiently. Likewise, in cases where the total weight of the recurring units corresponding to R(−)- and S(+)-3-hydroxybutyric acid is less than 90% by weight of the racemic PHB copolymer, the nature of a PHB polymer may not be improved sufficiently.

A catalyst which is useful in the synthesis of a racemic PHB copolymer from a racemic BL mixture can be prepared by the method described in Macromolecules, 10, 275 (1977). According to this method, the catalyst is made by reacting 1 mole of diethylzinc with 0.6 moles of water in an inactive solvent such as dioxane in an inert gas atmosphere such as a nitrogen or argon atmosphere followed by removal of the solvent by vacuum distillation, for example.

The catalyst thus prepared is added to a racemic BL mixture in an amount of 1 to 5 parts by weight for each 100 parts by weight of the racemic BL mixture and the mixture is kept at around 60° C. for about 5 days to allow the ring-opening polymerization of the racemic BL mixture to proceed. The resulting crude product of a racemic PHB copolymer can be then purified by dissolving in chloroform, pouring the resulting solution into diethyl ether, removing the diethyl ether layer by decantation, and drying the residue in vacuum to give a purified product of the racemic PHB copolymer.

The above-described method of synthesis of a racemic PHB copolymer is merely illustrative and other methods can be employed to prepare a racemic PHB copolymer used in the invention.

It has been found that the racemic PHB copolymer which is blended with a PHB polymer according to the present invention has a considerable biodegradability by itself and is completely compatible with a PHB polymer since it contains a substantial amount of recurring units derived from R(−) isomer of 3-hydroxybutyric acid which is the major constituent monomer of the biodegradable PHB polymer. Furthermore, in contrast with a PHB polymer, the racemic PHB copolymer is a flexible or viscid polymer. As a result, when it is blended with a PHB polymer, the stiff and brittle nature of the PHB polymer is improved while substantially maintaining the biodegradability of the PHB polymer and a completely biodegradable article which has good mechanical properties and which is free from exudation or separation of the racemic PHB copolymer from the PHB polymer can be obtained.

The PHB polymer and the racemic PHB copolymer are blended in a proportion of from 3 to 4,000 parts, preferably from 5 to 2,000 parts, and more preferably from 10 to 1,000 parts by weight of racemic PHB copolymer for each 100 parts by weight of PHB polymer. Less than 3 parts of the racemic PHB copolymer are insufficient to significantly improve the stiff and brittle nature of the PHB polymer, while more than 4,000 parts of the racemic PHB copolymer soften the resulting polymeric composition too much, thereby adversely affecting the mechanical properties of articles prepared therefrom.

The polymeric composition may further comprise one or more additives in addition to the PHB polymer and the racemic PHB copolymer. In such cases, it is preferred that the total weight of the PHB polymer and the racemic PHB copolymer comprise at least 80% and preferably at least 90% of the total weight of the composition. Most preferably, the polymeric composition consists essentially of the PHB polymer and the racemic PHB copolymer.

Examples of the additives which may be present in the polymeric composition of the present invention in minor amounts are reinforcing fillers such as fiberglass and similar fibers, as well as various stabilizers including antioxidants, heat stabilizers to prevent thermal degradation, and UV absorbers. Specific examples of useful stabilizers are oxides of alkaline earth metals, cuprous iodide, substituted benzophenones, piperidine derivatives, aromatic amines, and phenols such as 4,4'-bis(2,6-di-tert-butylphenol). If present, these additives are preferably added in a total amount of less than 20% and more preferably less than 10% based on the total weight of the polymeric composition.

The PHB polymer and the racemic PHB copolymer can be blended by any known method, such as by milling under heating or solution mixing, to prepare a polymeric composition of the present invention.

Milling of a PHB polymer and a racemic PHB copolymer can be performed using a suitable device such as a roll mill, a pressure kneader, or an extruder at a temperature which varies from 100° to 200° C. depending on the proportions of the two polymers and the particular milling device used.

Solution mixing can be accomplished by dissolving a PHB polymer and a racemic PHB copolymer together in an appropriate solvent capable of dissolving both these polymers followed by removal of the solvent. Useful solvents include chloroform, methylene chloride, 1,2-dichloroethane, and the like.

The resulting blend, i.e., polymeric composition of the invention can be shaped into film, fiber, tape, sheet, or similar form by a conventional technique such as casting or compression molding. The resulting shaped article is sufficiently flexible for practical applications and withstands a high degree of stretching. Therefore, it can be drawn at a high draw ratio to improve the mechanical properties of the article.

In the polymeric composition according to the present invention, the two polymeric constituents, i.e., the PHB polymer and racemic PHB copolymer have the same chemical formula but their optical activities are different from each other. Therefore, they have nearly the same chemical properties and hence are completely compatible with each other. As a result, exudation of one of the polymers during or after use and environmental pollution caused thereby can be completely prevented. Furthermore, due to the fact that the chemically-synthesized racemic PHB copolymer which is blended with the microbiologically-produced biodegradable PHB polymer is also biodegradable to a considerable degree, the polymeric composition is completely biodegradable and has a high biodegrading rate comparable to or even higher than the PHB polymer itself.

The polymeric composition is suitable for use as packaging materials as well as materials for medicine, agriculture, forestry, and fishery.

The following examples describe the invention in more detail.

EXAMPLES

Example 1

I. Synthesis of Racemic PHB Copolymer (a) Preparation of catalyst

To a 50 ml Schlenk flask which had been purged with nitrogen were added successively 15 ml of 1,4-dioxane which had been thoroughly purified and dehydrated and 3.5 ml of diethylzinc in a stream of nitrogen. Subsequently, 0.37 ml of deoxygenated water was added to the flask over 15 minutes under stirring in a stream of nitrogen at 50° C. The reaction was allowed to proceed at room temperature for 10 hours and the 1,4-dioxane solvent was then removed by vacuum distillation at room temperature. The residue was thoroughly dried in vacuum to give 3.5 g of the desired catalyst as a yellow solid.

(b) Preparation of racemic PHB copolymer

To a 50 ml Schlenk flask were added 0.2 g of the yellow solid prepared above in a stream of nitrogen and then 7 ml of a racemic BL mixture which was an equimolar mixture of R(+)-beta-butyrolactone and S(−)-beta-butyrolactone, also in a stream of nitrogen. The mixture was reacted for 5 days at 60° C. to give a crude product of the desired racemic PHB copolymer. The crude product was dissolved in 10 ml of chloroform and the resulting solution was slowly poured into 100 ml of diethyl ether with stirring. After stirring for 30 minutes, the mixture was allowed to stand for another hour and the diethyl ether was then removed by decantation. The residue was dried in vacuum at room temperature to give 5.3 g of a purified racemic PHB copolymer. The racemic PHB copolymer product had a number-average molecular weight of 26,000 and a weight-average molecular weight of 47,000. The differential thermal analysis of the product showed that it had a glass transition temperature of −1° C. and did not have a melting point.

II. Blending of PHB Polymer and Racemic PHB Copolymer

Predetermined amounts of a microbiologically-produced PHB polymer which was a homopolymer of R(−)(3-hydroxybutyric acid) having a number-average molecular weight of 362,000 and a weight-average molecular weight of 652,000 and the racemic PHB copolymer prepared above were dissolved in 20 ml of chloroform. The resulting solution was cast onto a petri dish and allowed to stand for at least 24 hours at room temperature to evaporate the chloroform solvent. The residue was thoroughly dried in vacuum to give a 50 μm-thick film of a blend of the PHB polymer and the racemic PHB copolymer.

The resulting film was subjected to a tensile test in accordance with the testing procedure specified in JIS K7127 using a #2 test piece at a stress rate of 2 cm/min to determine the mechanical properties thereof. The test results are summarized in Table 1 along with the blending ratio.

TABLE 1

| Mechanical properties of PHB*/racemic PHB** | | | |
|---|---|---|---|
| Sample | Blending Ratio (wt/wt) | Tensile Strength (MPa) | Elongation (%) |
| PHB | — | 38 | 5 |
| PHB/racemic PHB | 95/5 | 30 | 100 |
| PHB/racemic PHB | 75/25 | 20 | 230 |
| PHB/racemic PHB | 50/50 | 12 | 390 |
| PHB/racemic PHB | 25/75 | 3 | >500 |
| PHB/racemic PHB | 5/95 | 2 | >500 |

*PHB: PHB polymer;
**racemic PHB: racemic PHB copolymer.

As shown in Table 1, the stiff and brittle nature of the PHB polymer could be significantly improved by blending it with a racemic PHB copolymer and flexible polymeric compositions having an elongation of from 100% to 500% or higher were obtained.

III. Biodegradability test

The biodegradability of some of the 50 μm-thick films prepared above was tested in the following manner using 1 cm-square test pieces each weighing 6 mg.

A 0.2 g amount of soil collected in Kashima, Ibaraki-prefecture, Japan was extracted with 5 ml of sterilized water and a 0.2 ml aliquot of the extract was added to 5 ml of a culture medium having the composition shown in Table 2 in weight percent. The resulting dispersion was used as a testing liquid to evaluate the biodegradability of the test pieces.

TABLE 2

| Composition of culture medium (wt %) | | |
|---|---|---|
| 0.1% $NH_4NO_3$ | 0.1% $KH_2PO_4$ | 0.1% $Na_2HPO_4$ |
| 0.02% $MgSO_4.7H_2O$ | 0.01% yeast extract | 0.001% $FeSO_4.7H_2O$ |
| 0.001% $MnSO_4.7H_2O$ | 0.001% $ZnSO_4.7H_2O$ | 0.001% $CaCl_2.2H_2O$ |
| pH = 7.0 | | |

A test piece of each film to be tested was placed into the testing liquid and shaken for 48 hours at 30° C. Thereafter, the film was removed from the testing liquid, dried, and weighed to determine the weight loss as an indication of biodegradability. The test results are summarized in Table 3 below.

TABLE 3

| Biodegradability of PHB*/racemic PHB** | | |
|---|---|---|
| Sample | Blending Ratio (wt/wt) | Weight Loss (mg) |
| PHB | — | 2.1 |
| PHB/racemic PHB | 75/25 | 2.4 |
| PHB/racemic PHB | 50/50 | 2.9 |
| PHB/racemic PHB | 25/75 | 3.5 |

*PHB: PHB polymer;
**racemic PHB: racemic PHB copolymer.

As is apparent from the results shown in Table 3, all the PHB polymer/racemic PHB copolymer blends of the present invention had higher biodegradability than the PHB polymer used as a control.

COMPARATIVE EXAMPLE 1

Following the procedure described in Example 1, the PHB polymer used in Example 1 was blended with different polymers by solution blending using chloroform as a solvent to form 50 μm-thick films which were then tested for mechanical properties. The test results are summarized in Table 4.

TABLE 4

| Mechanical properties of comparative PHB blend | | | |
|---|---|---|---|
| Sample | Blending Ratio (wt/wt) | Tensile Strength (MPa) | Elongation (%) |
| PHB[1] | — | 38 | 5 |
| PHB/PCL[2] | 77/33 | 21 | 9 |
| PHB/PCL[2] | 49/51 | 4 | 18 |
| PHB/PCL[2] | 25/75 | 8 | 11 |
| PHB/PBA[3] | 75/25 | 32 | 7 |
| PHB/PBA[3] | 49/51 | 19 | 4 |
| PHB/PBA[3] | 24/76 | 10 | 3 |
| PHB/PVAc[4] | 74/26 | 32 | 2 |
| PHB/PVAc[4] | 49/51 | 29 | 3 |
| PHB/PVAc[4] | 25/75 | 26 | 3 |

[1]PHB: PHB polymer;
[2]PCL: Polycaprolactone;
[3]PBA: Polybutylene adipate;
[4]PVAc: Polyvinyl acetate.

As is apparent from the results shown in Table 4, none of the comparative blends of a PHB polymer with different polymers other than a racemic PHB copolymer could significantly improve the stiff and brittle nature of the PHB polymer.

The principles, preferred embodiments, and mode of operation of the present invention have been described. The invention, however, is not limited to the particular forms disclosed, since the details set forth above are to be regarded as illustrative rather than restrictive. Variations and modifications may be made by those skilled in the art without departing from the spirit of the invention.

What is claimed is:

1. A biodegradable polymeric composition comprising 100 parts by weight of a first polymer which is a microbiologically-produced homopolymer or copolymer of R(—)-3-hydroxybutyric acid, and from 3 to 4,000 parts by weight of a second polymer which is a chemically-synthesized random copolymer of R(—)-3-hydroxybutyric acid and S(+)-3-hydroxybutyric acid.

2. The biodegradable polymeric composition of claim 1, wherein the second polymer is present in an amount of from 5 to 2,000 parts by weight.

3. The biodegradable polymeric composition of claim 2, wherein the second polymer is present in an amount of from 10 to 1,000 parts by weight.

4. The biodegradable polymeric composition of claim 1, wherein the first polymer is a microbiologically-produced homopolymer of R(—)-3-hydroxybutyric acid.

5. The biodegradable polymeric composition of claim 1, wherein the first polymer is a microbiologically-produced copolymer of at least 50 mole % of R(—)-3-hydroxybutyric acid and less than 50 mole % of one or more copolymerizable monomers.

6. The biodegradable polymeric composition of claim 1, wherein the second random copolymer contains the recurring units derived from R(—)-3-hydroxybutyric acid and those from S(+)-3-hydroxybutyric acid at a molar ratio of the R(—) isomer to the S(+) isomer in the range of from 100:60 to 100:165.

7. The biodegradable polymeric composition of claim 6, wherein the molar ratio of the R(—) isomer to the S(+) isomer is in the range of from 100:90 to 100:110.

8. The biodegradable polymeric composition of claim 1, wherein the second random copolymer further comprises one or more additional monomers in a total amount of at most 10% by weight.

9. The biodegradable polymeric composition of claim 1, wherein the total weight of the first and second polymers is at least 80% of the total weight of the composition.

10. The biodegradable polymeric composition of claim 9, which further comprises one or more additives selected from reinforcing fillers and various stabilizers including antioxidants, heat stabilizers, and UV absorbers in a total amount of up to 20% by weight of the composition.

11. A biodegradable article of the polymeric composition of claim 1.

12. The biodegradable article of claim 11, wherein the article is in the form of a film, sheet, tape, or fiber.

13. The biodegradable article of claim 12, wherein the article is subjected to drawing so as to improve the mechanical properties.

* * * * *